Figure 1:
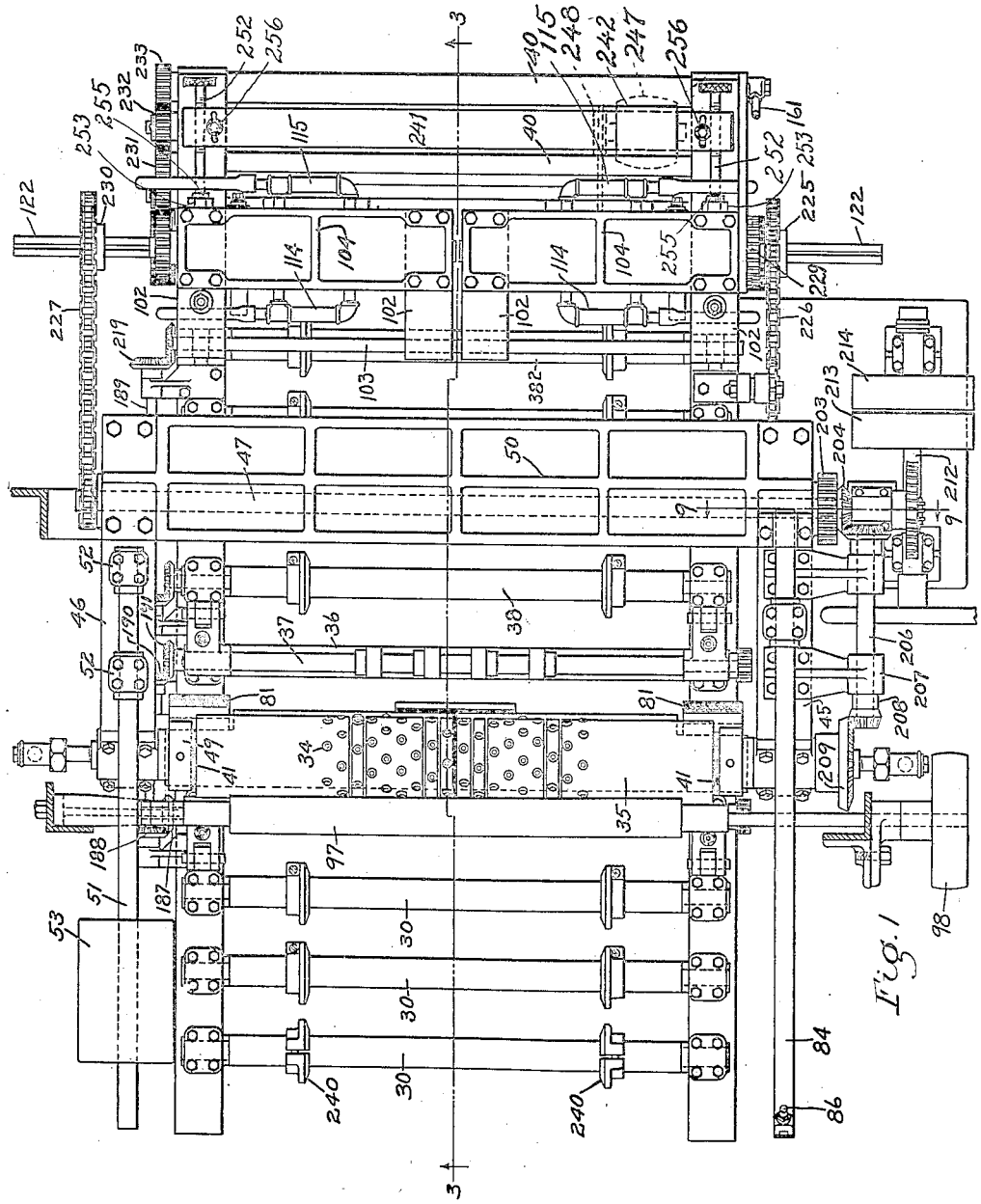

S. B. FIELD.
ELECTRIC WELDING MACHINE.
APPLICATION FILED MAR. 20, 1914.

1,127,425.

Patented Feb. 9, 1915.
9 SHEETS—SHEET 1.

Witnesses.
Helen M. Purcell
John H. Parker

Inventor:
Samuel B. Field
by Macleod, Calver, Copeland & Dike
Attorneys.

S. B. FIELD.
ELECTRIC WELDING MACHINE.
APPLICATION FILED MAR. 20, 1914.

1,127,425.

Patented Feb. 9, 1915.
9 SHEETS—SHEET 2.

Witnesses
Helen M. Purcell
John H. Parker

Inventor
Samuel B. Field
by Macleod, Calver, Copeland & Dike
Attorneys

S. B. FIELD.
ELECTRIC WELDING MACHINE.
APPLICATION FILED MAR. 20, 1914.

1,127,425.

Patented Feb. 9, 1915.
9 SHEETS—SHEET 6.

Witnesses.
Helen M. Purcell
John H. Parker

Inventor:
Samuel B. Field
by Macleod, Calver, Copeland & Dike
Attorneys.

S. B. FIELD.
ELECTRIC WELDING MACHINE.
APPLICATION FILED MAR. 20, 1914.
1,127,425.
Patented Feb. 9, 1915.
9 SHEETS—SHEET 7.
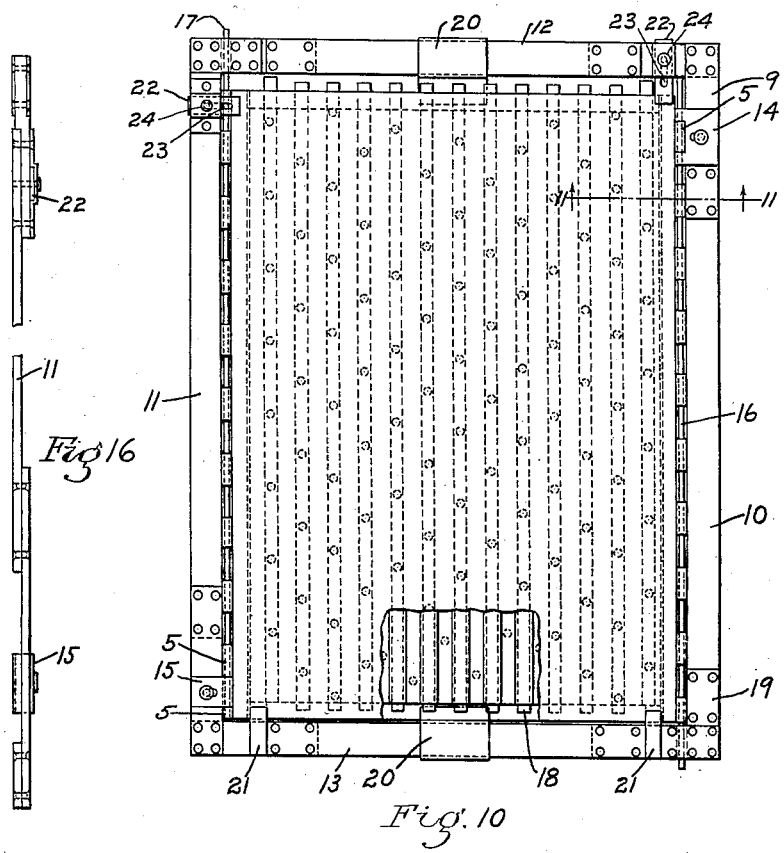
Fig. 16
Fig. 10
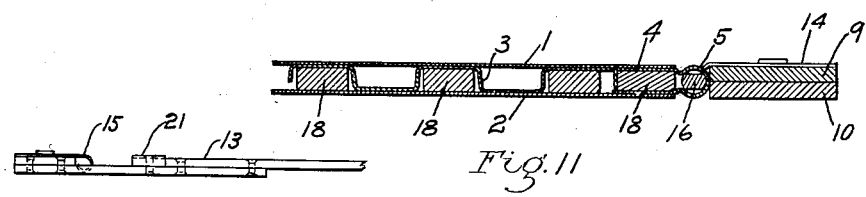
Fig. 11
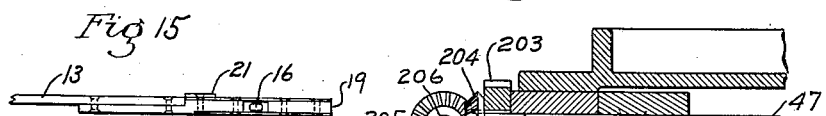
Fig. 15
Fig. 14
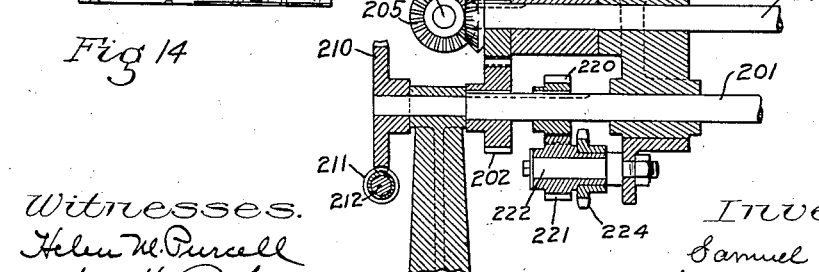
Fig. 9
Witnesses.
Helen M. Purcell
John H. Parker
Inventor:
Samuel B. Field
by Macleod, Calver, Copeland & Dike
Attorneys.

S. B. FIELD.
ELECTRIC WELDING MACHINE.
APPLICATION FILED MAR. 20, 1914.

1,127,425.

Patented Feb. 9, 1915.

9 SHEETS—SHEET 8.

Witnesses.
Helen M. Purcell
John H. Parker

Inventor:
Samuel B. Field
by Macleod, Calver, Copeland & Dike
Attorneys

S. B. FIELD.
ELECTRIC WELDING MACHINE.
APPLICATION FILED MAR. 20, 1914.

1,127,425.

Patented Feb. 9, 1915.
9 SHEETS—SHEET 9.

Witnesses
Helen M. Purcell
John H. Parker

Inventor
Samuel B. Field
by Macleod, Calver, Copeland & Dike
Attorneys

UNITED STATES PATENT OFFICE.

SAMUEL B. FIELD, OF HOLBROOK, MASSACHUSETTS, ASSIGNOR OF ONE-FOURTH TO PNEUMATIC SCALE CORPORATION, LIMITED, OF QUINCY, MASSACHUSETTS, A CORPORATION OF MAINE, AND THREE-FOURTHS TO WILLIAM H. DOBLE, OF QUINCY, MASSACHUSETTS.

ELECTRIC WELDING-MACHINE.

1,127,425.    Specification of Letters Patent.    Patented Feb. 9, 1915.

Application filed March 20, 1914. Serial No. 826,000.

*To all whom it may concern:*

Be it known that I, SAMUEL B. FIELD, a citizen of the United States, residing at Holbrook, county of Norfolk, State of Massachusetts, have invented a certain new and useful Improvement in Electric Welding-Machines, of which the following is a specification, reference being had therein to the accompanying drawings.

In electric welding machines heretofore in use for welding together two plates or bars of metal it has been customary to unite them by spot welding, so-called, whereby the two parts are welded together in spots at intervals apart from each other, this being done usually by interposing the two plates which are to be welded together between two pins or points which form electric terminals connected with a transformer in a circuit, and then by bringing these two terminals into contact with the opposite faces of the two plates, said two plates being in contact with each other so as to complete the circuit, the two plates are welded together at the spots in contact with the said terminals. After the two plates are united at one point in this manner the pins are separated from contact with the plates, then the plates are moved along to another position between the said pins which are again brought into contact with the plates and the plates are then again united at such second spot engaged by the pins. This process is continued, moving the plate about from one position to another until the requisite number of points of union are accomplished. By this method, however, the welding can take place only at one spot at a time and the welding pins have to be withdrawn from contact after each operation, and then the plates have to be moved along and the pins brought into contact again, thus making a slow and laborious process.

One object of the present invention is to provide such a construction that there will be automatically a sequence of welding spots at various points, and another object is that there may be simultaneous welding at two or more different spots or there may be a continuous line or lines of welding and an automatic feed to carry the two plates or elements which are to be welded together.

Other features of the invention will be set forth hereinafter.

In order to produce spot welding there must be pressure and heat and time. If it be attempted to weld the two plates together at two different spots simultaneously if they are connected with only one transformer there must be twice as much current as would be required for welding only at one spot, because the current has to be divided or split, going half to each spot. Under practical conditions, however, owing to the fact that there is almost always more or less lack of uniformity in the conductivity of a given plate, due to either scale on the plate or difference in density or to other conditions, it is found that the current will not split even, so that a greater amount of current than is necessary goes to one spot and burns the plate and melts part of the point, while the other point does not receive sufficient current to make a weld. For the above reasons I have found that more perfect results are obtained if it is attempted to make the weld at only one spot at a time with each transformer. In order, however, to carry the current to make the second spot I have found that it is desirable to so arrange the contact points that before the contact point which is making the weld entirely leaves contact with the plate the next succeeding point should begin to make contact. It is necessary that the second point shall begin to contact with the plate before the first point fully leaves the plate in order to provide a continuous outlet for the current and avoid drawing an arc. It is also found that in spot welding there is a tendency of the plate to buckle at the point of the weld and that it will buckle if the pressure is entirely removed before the plate has sufficiently cooled, as for instance, if the contact point is withdrawn all at once, such for instance as would take place if the contact point has a movement at right angles away from the plate. The effect of the buckling is to draw the sheet that buckles away from the other sheet and therefore prevent the weld.

I have found that if the contact point which makes the pressure is withdrawn only a portion at a time, as for instance by being mounted on a rotary carrier such as a roll, that the gradual removal of the pressure by this rotary action will hold the plates under sufficient pressure to prevent the buckling. That is, the portion of the contact point which still remains in contact with the plate will exert sufficient pressure to prevent the buckling under that portion from which the point has already withdrawn from contact. As the contact point which has just made the weld begins to move away in the rotation of the roll the pressure from that particular contact point will diminish.

One particular use for which my invention is especially adapted is the welding together of the plates for forming hollow walls or panels for metallic boxes or shipping cases, especially of the folding variety, such for instance, as shown in application made by William H. Doble and Samuel B. Field, Ser. No. 752,593, and for the purpose of more clearly illustrating the construction and operation of a machine embodying my present invention I have shown portions of a panel of the character above referred to in which the panel is composed of two parallel flat plates having a corrugated metal plate interposed between said two parallel plates, all three plates being welded together by the machine of my invention and said panel also having a hinge plate formed with a box shank which is inserted between the said two flat plates along one edge thereof, and is welded to said two wall plates, said hinge plate being formed with upwardly extending knuckle portions. It is to be understood, however, that the invention is not limited to use in the construction of box panels or in the welding of plates of the particular form shown and described.

The invention will be understood from the following description taken in connection with the accompanying drawings and the novel features thereof will be pointed out and clearly defined in the claims at the close of the specification.

Figure 2:
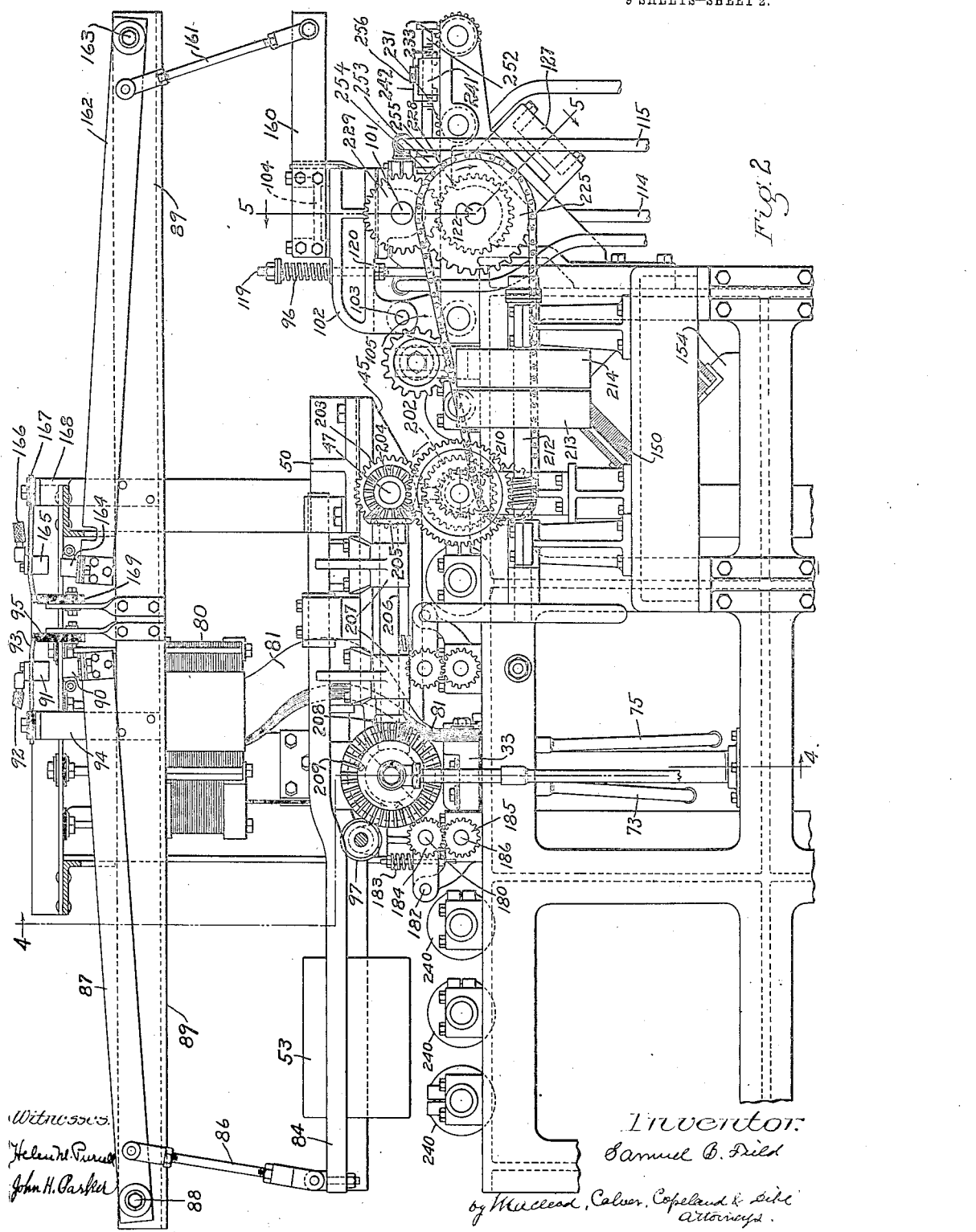
Figure 3:
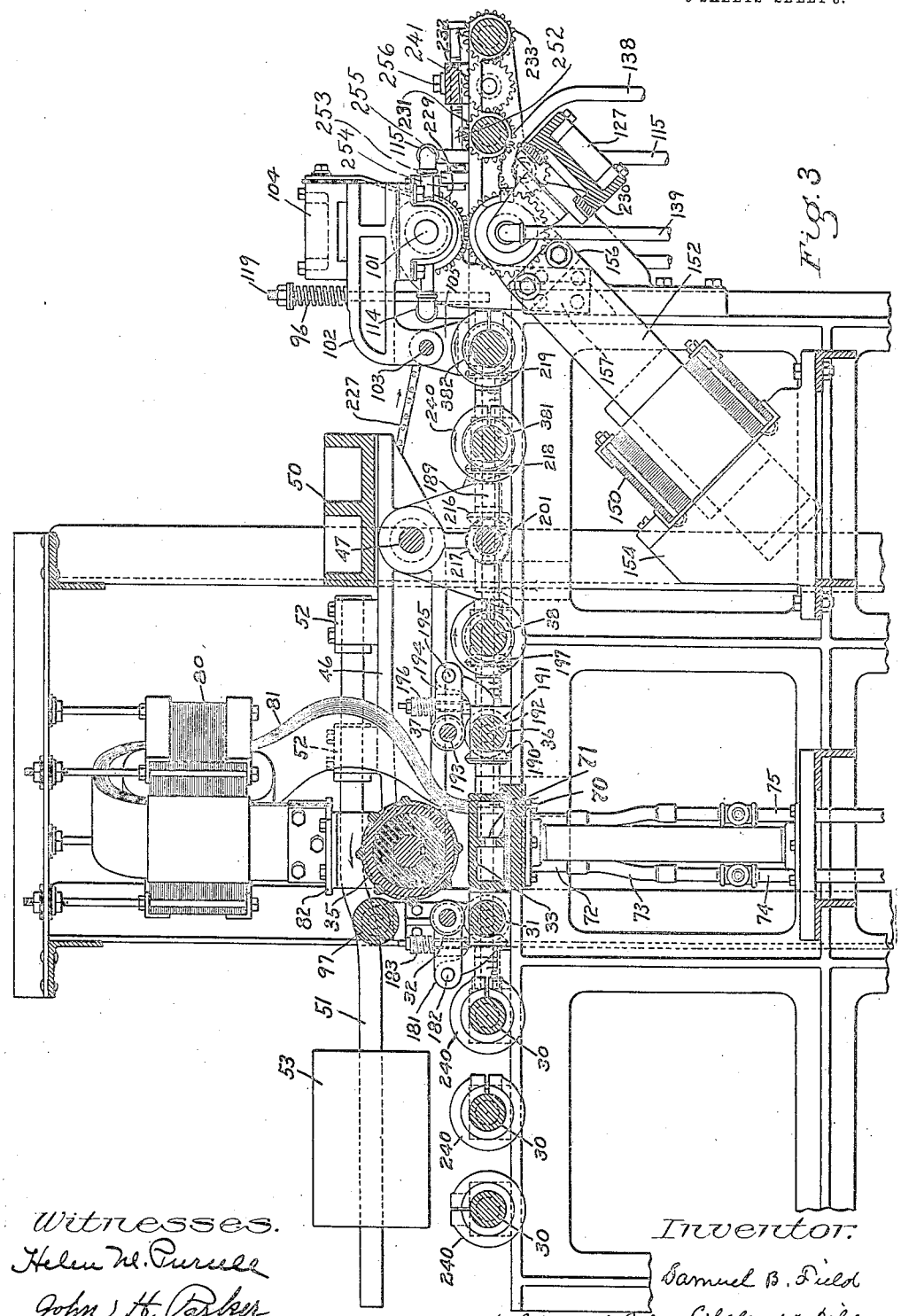
Figure 4:
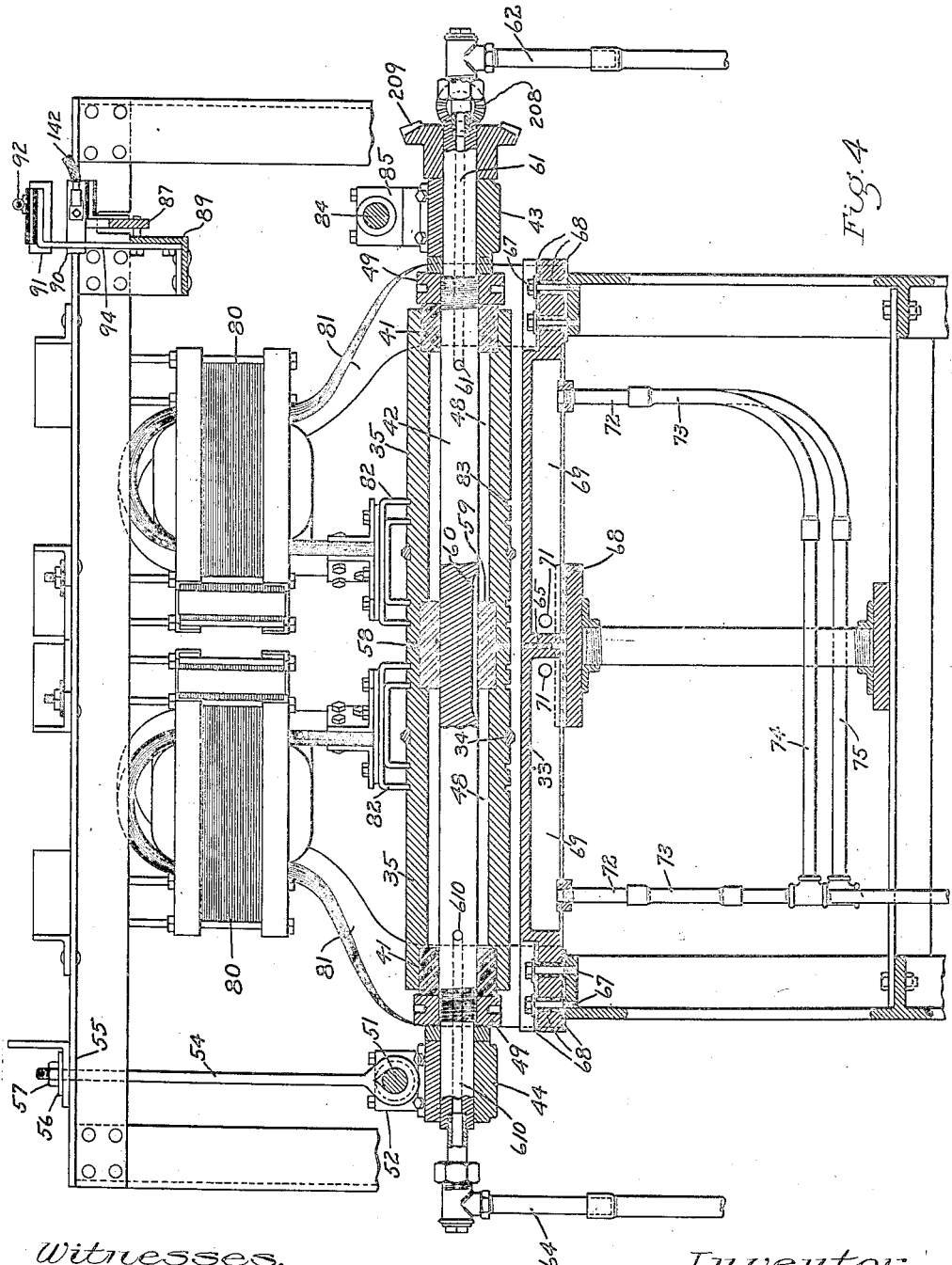
Figure 5:
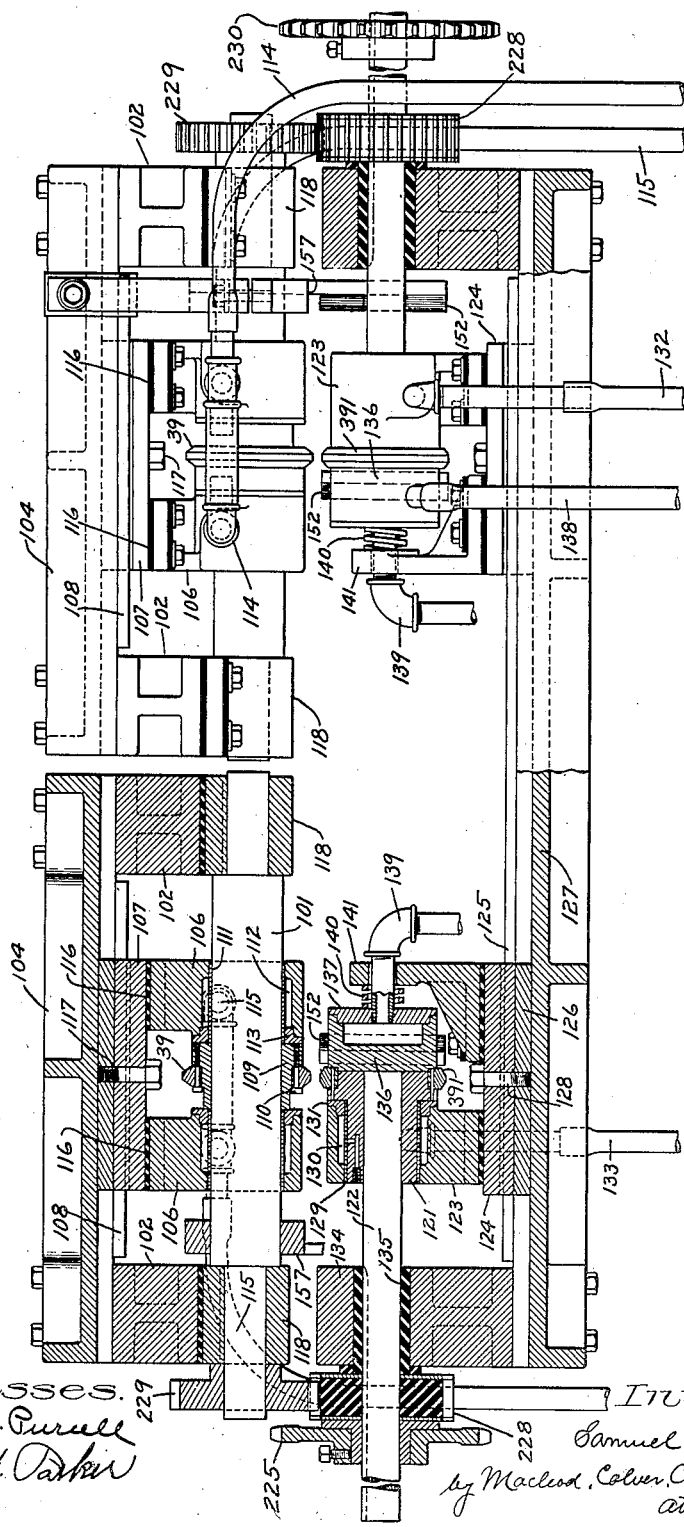
Figure 6:
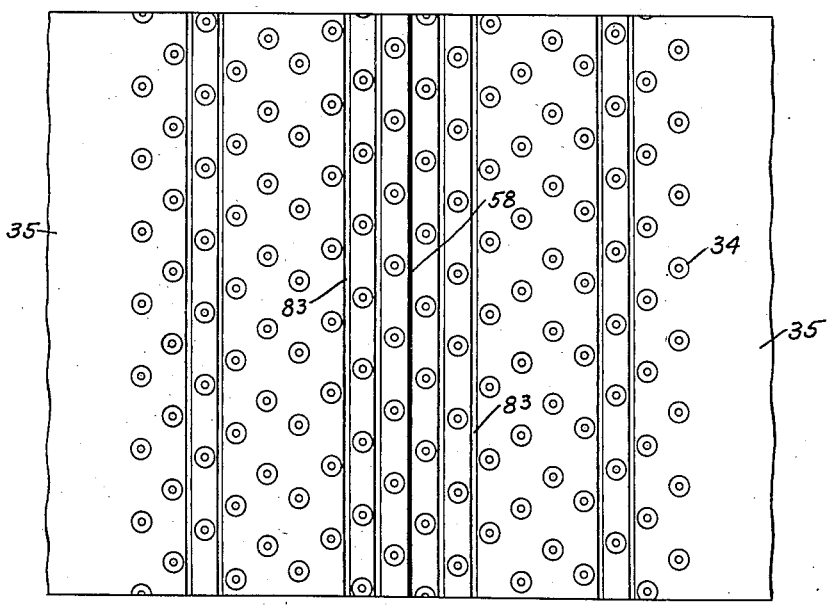
Figure 7:
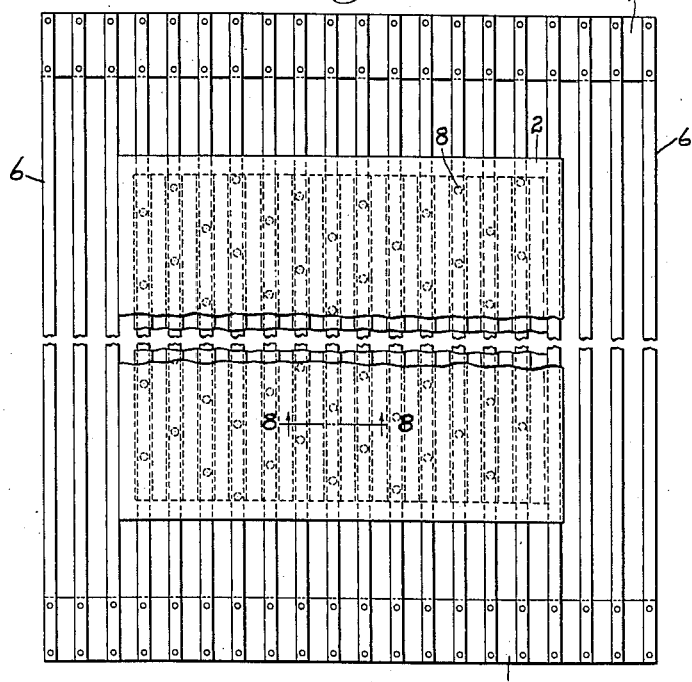
Figure 8:
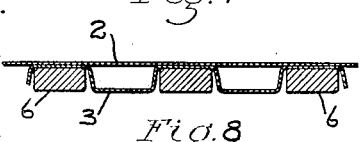
Figure 12:
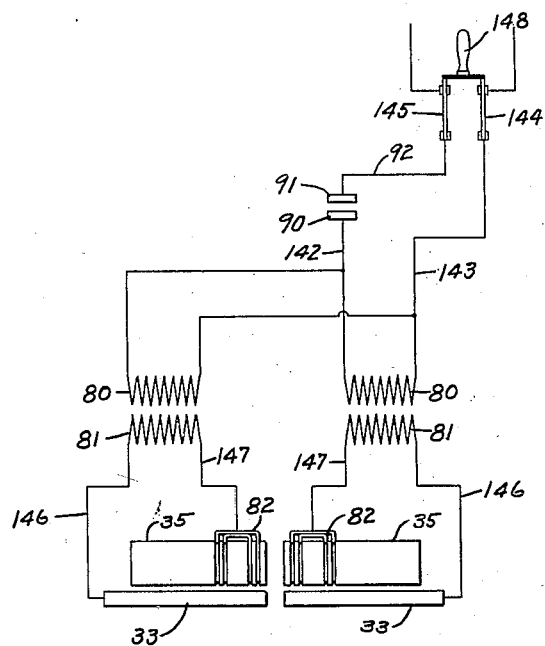
Figure 13:
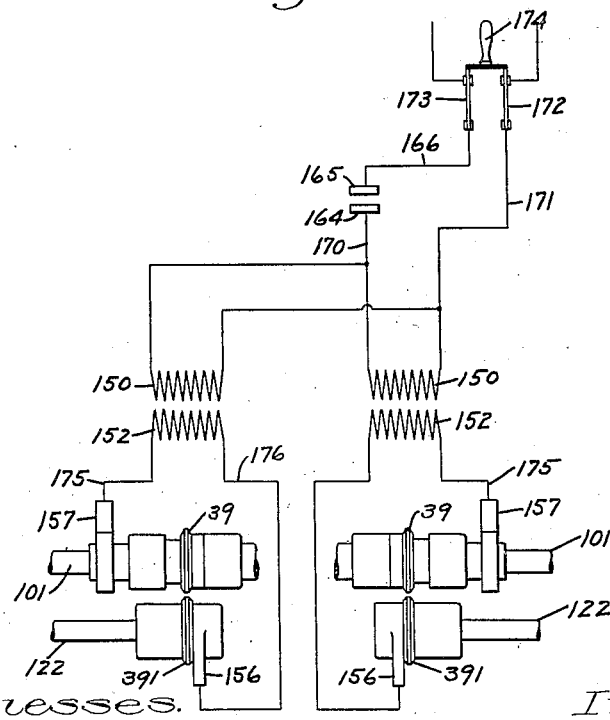
Figure 17:
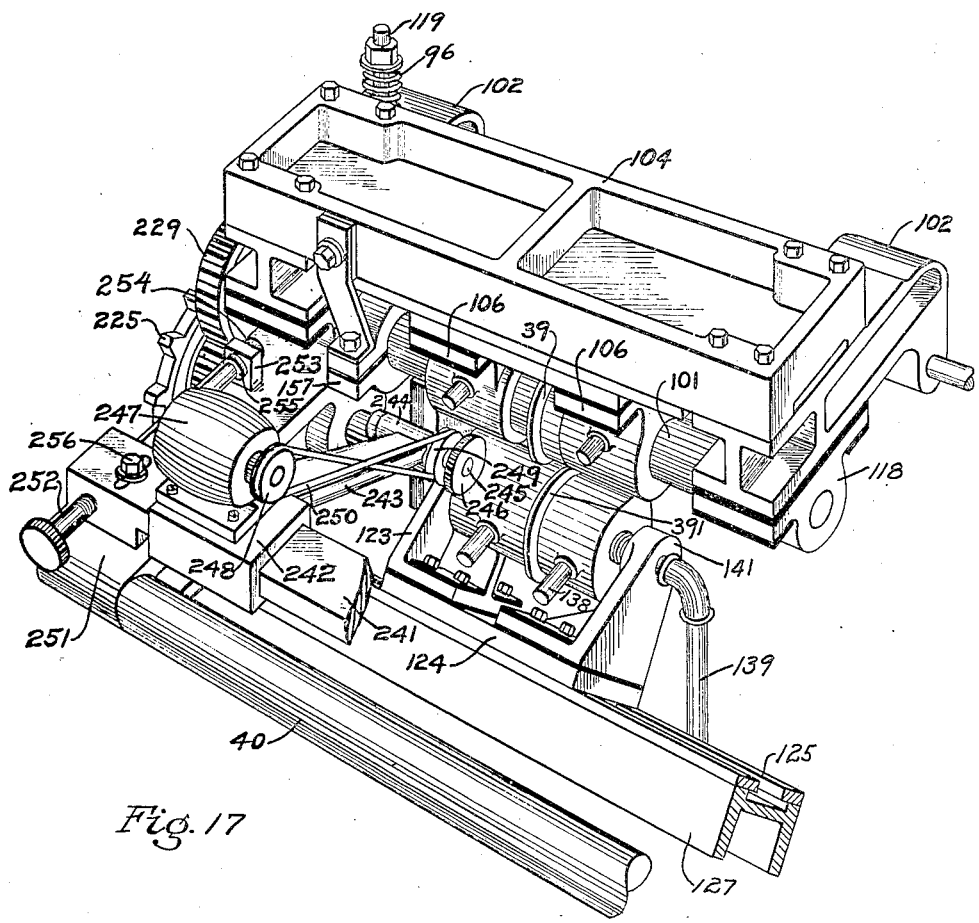

In the drawings,—Figure 1 is a plan of a machine embodying the invention, the transformer and overhead parts being removed. Fig. 2 is a side elevation of the machine shown in Fig. 1, as viewed from the lower side of Fig. 1 and showing the transformer and other overhead parts. Fig. 3 is a vertical section on line 3—3 of Fig. 1. Fig. 4 is a section on line 4—4 of Fig. 2. Fig. 5 is an enlarged view partly in section on line 5—5 of Fig. 2. Fig. 6 is a development of the spot welding roll. Fig. 7 is a plan view partly broken away of a grid with one of the flat plates and the corrugated plate held by said grid in assembled relation to each other ready to be passed through the welding machine for the purpose of spot welding. Fig. 8 is a section enlarged on line 8—8 of Fig. 7. Fig. 9 is an enlarged sectional view partly broken away of a certain portion of the driving mechanism of the machine. Fig. 10 is a plan view partly broken away showing the second wall plate and the hinged plate in assembled relation to the corrugated plate and the said first wall plate after the corrugated plate and first wall plate have been welded together and being now held in a jig preparatory to being passed through the second process of welding to unite the said second wall plate and the hinge plate to the first wall plate and corrugated plate. Fig. 11 is a sectional view enlarged on line 11—11 of Fig. 10. Fig. 12 is a diagram showing the wiring for the spot welding. Fig. 13 is a diagram showing the wiring for the strip welding, that is, for the welding in continuous lines, such as takes place to unite the hinge plate to the two wall plates. Fig. 14 is an end view enlarged of the lower right-hand corner of the jig shown in Fig. 10. Fig. 15 is an end view enlarged of the lower left-hand corner of Fig. 10. Fig. 16 is a left-hand side view of the jig shown in Fig. 10. Fig. 17 is a perspective view showing one pair of the strip welding rolls and their grinding mechanism.

In order to give a better preliminary understanding of the purpose and construction of the machine, especially the particular form of machine shown in the drawings as embodying the invention, the panel such as hereinbefore referred to and the method of assembling the several parts which are to be welded together to form the panel will first be described. This is particularly shown in Figs. 7, 8, 10 and 11. The panel is composed of the two flat plates 1, 2 which may be termed respectively the outer and inner plates, an interposed corrugated plate 3 which is so corrugated as to form a series of flat portions in parallel planes alternately engaging with the two flat plates 1, 2, and a hinge having a box shank 4 and a series of eyes 5 to receive a hinge pin, the entire hinge being formed integral, and said box shank portion being of a thickness to just fit between the two flat plates 1, 2. These four members, that is, the plates, 1, 2, the corrugated plate 3, and the shank of the hinge are all to be welded together. This can be accomplished by the machine of the present invention, as shown in the drawings. First, the corrugated plate 3 and the inner plate 2 are assembled together, as shown in Figs. 7 and 8, and they are put through the spot welding portion of the machine, then the said two plates thus united together are taken out and they are assembled with the outer plate 1 and the hinge portion, as shown in Figs. 10 and 11, and they are then all put through both the spot welding and the strip welding mechanisms of the machine to complete the welding operation.

The manner of assembling and holding together the plate 2 and the corrugated plate 3 for the first operation is as follows: A grid is provided consisting of a series of parallel slats 6 of electric conducting material secured to two tie bars 7, 7 at opposite ends thereof, said slats 6 being spaced apart far enough so that the corrugated plate 3 may be laid upon the grid with the alternate corrugations engaging the spaces between the slats so that there will be no lateral movement of the corrugated plate. The slats 6 are preferably of copper or other suitable material that has a low resistance as compared with the metal plates which are to be welded together and form a good electrical contact with the flat portions of the corrugated plate resting thereon. The flat plate 2 is then laid on the top of the corrugated plate, as shown in Figs. 7 and 8, with alternate flat portions of the corrugated plate in contact with the plate 2, and the grid with the parts thus mounted are ready to be inserted into the welding machine.

The welding machine is provided with guides 240 on the carrier rolls which engage the two opposite sides of the grid in its passage through the machine to prevent lateral displacement of the grid. This operation will in a manner hereinafter described weld the plate 2 to the flat portions of the corrugated plate 3 which are in contact with the plate 2 at various spots, as indicated by the points 8, in Fig. 7. After the plate 2 and corrugated plate 3 are welded together, the grid will be removed from the machine and the united plates 2 and 3 will be removed from the grid and bars 18 of good conducting material, preferably copper, for the same reason as described in relation to the slats 6 of the grid, will be inserted in alternate spaces in the corrugated plate. Then the plate 1 and the hinge plates are all assembled in proper relation and placed in a jig shown in Figs. 10 and 11. When placed in the jig, the plate 2 and corrugated plate 3 are turned the reverse side up from that shown in Figs. 7 and 8 so that the plate 1 will be on the upper side. The jig consists of a four sided frame, as shown in Fig. 10, in the form of an open square, having the side and end strips 10, 11, 12 and 13. The space between the two side strips 10, 11 is just sufficient to receive the assembled plates 1, 2, 3 and the hinge plate. Secured to the strip 9 which laps onto strip 10 is a clip 14 which is formed with a recess in the inner edge of just sufficient length and depth to receive one of the eyes 5 of the hinge plate. Secured to the opposite side strip 11 is a clip 15 which is adapted to engage between two eyes 5, 5 of the hinge plate which is inserted into the edge of the panel on that side; thus the hinge plates are positioned against movement. The side and end strips are secured together between flat top and bottom plates in such manner as to leave a passage directly in alinement with the eyes 5 of the hinge plate so that a locking pin or rod 16 may be passed through said passage and through the eyes of the hinge plate on one side of the panel and a similar locking pin 17 may be inserted through the eyes of the hinge plate on the opposite edge. At the corners of the frame there are plates riveted to the side and end strips 10, 11, 12 and 13 to firmly hold the frame together. Slidably mounted on each of the two end strips 12, 13 of the frame is a loop-shaped clip 20 having a portion on the under side of the frame which projects beneath the end of the plate 2 so as to form a support for the same. Secured to the end strip 12 is a clip 22 which is adapted to reach over the upper edge of the plate 1, and secured to the side strip 11 at one end is a similar clip 22 which is also adapted to reach over the edge of the plate 1. These two clips 22, 22 are each formed with an elongated slot 23 which is engaged by a pin 24 secured to the strips to form guides for the said clips 22 so that they may be withdrawn, and the clips 20 both being slidable on their respective strips may be moved endwise on their said strips so that the assembled plates 1, 2 and 3, and the hinge plates may be inserted into the jig. Then the said movable slips are moved into the position shown in Fig. 10 and the locking pins 16 and 17 are inserted.

Secured to the end strip 13 are the two clips 21 which project over the top of the upper plate 1 so that as the clips 20 are engaged with the under face of the plate 2 the overreaching top clips 21 and 22 serve to keep the assembled plates 1, 2, and 3 from tilting on the supporting clips 20. The several clips and locking pins will hold the assembled parts in fixed relation to each other. When the parts are thus assembled, as shown in Fig. 10, they are ready to be passed through the welding machine a second time for the purpose of first welding together the plate 1 and the corrugated plate 3, and at the same operation to pass it along to a further stage in the machine where the hinge plate will be welded to both the plates 1 and 2. It is desirable that the hinge should be welded by a continuous line the entire length of the hinge plate near the edge thereof.

The mechanism for performing the welding operation will now be described. The assembled parts which are to be welded together are introduced at the left-hand end of the machine as viewed in Figs. 1, 2 and 3, being passed over rotary idler rolls 30, thence they are gripped between the feed roll 31 and the presser roll 32, whence they are fed over the platen 33 where the upper plate is engaged by the projecting points 34 in the welding roll 35 which produces the spot welding, as will be hereinafter described, and after having passed the spot welding roll the assembled plates will be drawn between the feed roll 36 and presser roll 37 and carried forward by the carrier rolls 381 and 382. After they have entirely passed out from the spot welding roll and the feed roll 36 they can be taken from the machine if that is all the welding that is required, as in the case of uniting the plate 2 and the corrugated plate 3, but in the second passing through the machine after they have passed the welding roll 35 to weld the second flat plate 1 to the corrugated plate 3 the assembled parts will be passed along over the succession of carrier rolls 381, 382, thence between the upper strip welding rolls 39 and 39 and the lower strip welding rolls 391, 391 which are so spaced apart as to engage the shanks 4 of the hinge plates and produce a continuous line of welding until the jig with the assembled parts carried by the jig pass out onto the rolls 40 whence they can be taken off at the rear end of the machine. The feed rolls 31 and 36 should be driven at the same surface speed as the surface speed of the shell 35 of the spot welding roll.

The spot welding roll consists of a cylindrical metallic shell 35 of good conducting material, preferably copper, having in its periphery a plurality of contact points, preferably nubs 34 of conducting material which may be made integral therewith if desired, but preferably made separable therefrom, as for instance, being in the form of plugs or buttons inserted in the periphery. For reasons to be hereinafter described the shell 35 is preferably made in cylindrical sections insulated from each other. These nubs or buttons, as they will be termed for convenience, are preferably of copper and are distributed throughout the area of the roll in such manner that as the roll turns, no two buttons in the same insulated section will at the same time contact with the surface which is being welded sufficient to make a welding contact, that is, each button after making the contact will in the rotation of the roll continue slightly in contact, enough to support the roll and make the necessary pressure to prevent buckling and also to carry the current until the next succeeding button begins to contact with the plate, but will move sufficiently out of contact so that it will not carry enough current to make a welding heat after the said next button makes sufficient contact to carry enough current to make a weld. It is also preferable to arrange these buttons in staggered relation to each other. One reason for the staggered relation is because if the spots are all welded in the same line, as for instance, near one edge of the plate, while the opposite edge or the middle is left without any welding the unwelded portions will begin to curl. It is therefore found best to stagger the spots so that they will be successively welded at different points in the width of the plate so as to bind the two plates together at different points entirely across its width.

In order to insure the production of a flat sheet or plate from the welding machine, it has been found necessary to so distribute the points at which welds are made to avoid heating any one part of the plate greatly in excess of the balance of the plate, that is, the welding points are so staggered on the roll that a weld being made has time to cool off not only in itself, but the adjacent metal also has time to cool before another weld is made close to this weld just made.

The metallic shell 35 is provided at its ends with short bushings 41 of insulating material, such for instance, as fiber, and is mounted on a shaft 42 which is journaled in bearings 43, 44 respectively carried by the arms 45, 46 of a yoke fulcrumed on shaft 47. The diameter of the shaft 42 is smaller than the interior diameter of the shell 45 so that there is an annular chamber 48 surrounding the shaft 42. The bushings 41 have a smaller interior diameter and greater exterior diameter than the interior diameter of the chamber 48 and their inner ends abut against a shoulder on the inner periphery of the shell. The shaft 42 has its end portions of reduced diameter and has a screw threaded portion which receives the nuts 49 whereby the bushings 41 may be clamped firmly against the shoulders in the shell 35. These bushings fit tightly on the shaft so that when the nuts 49 are set up tight the shaft and shell will be made fast together and rotate as one.

The arms 45, 46 of the fulcrumed yoke previously mentioned are rigidly tied together at their rear ends by a cross beam 50 secured to the said arms, the said two arms 45, 46 and the cross beam 50 together forming the yoke. Said yoke may be rocked or tilted on said fulcrum shaft 47. When the yoke is tipped up on its fulcrum it carries up the welding roll 35 which is journaled in bearings carried by said yoke as previously described. The rigid connection of the several parts of the yoke with each other keeps the welding roll and shaft parallel with the platen. A rod 51 is secured to the arm 46 of said yoke, as by being mounted in brackets 52, 52 on the upper side of the arm 46, and extends alongside of the machine, projecting toward the front. A weight 53 is slidably mounted on said rod 51 and by adjusting said weight, the downward pressure of the welding roll upon the work while upon the platen may be regulated. A rod 54 looped around the weight rod 51 passes up loosely through a hole in the flanged top 55 of the frame so that it can slide up and down, and has a washer 56 and nut 57 on its upper end which form a stop to limit the downward position of the yoke and welding roll. This nut 57 may be adjusted to vary the downward position of the yoke and welding roll, so as to adapt it to plates of different thicknesses which are to be welded together.

The welding roll 35 is preferably made in a plurality of cylindrical sections in alinement with each other and tied together but insulated from each other, and the buttons 34 may if desired be disposed in the same position in each section, so that there shall be simultaneous electrical contact with the plates which are to be welded together by one of the buttons on each section without electrical connection of one section with the other. In the construction shown in the drawings, the said welding roll is made in two sections, see Figs. 1 and 4. The said two sections have their adjacent ends insulated from each other by an annular disk 58 of insulating material. There is also a collar 59 of insulating material surrounding the shaft 42 made fast to the shaft and fitting into a recess in the inner periphery of the roll 35, thus dividing the chamber 48 into two parts, said collar 59 extending on both sides of the disk 58. The shaft 42 is formed with a recess 60 in one side thereof, as shown in Fig. 4, which extends beyond both ends of the insulating collar 59 so that there is a communication between the two chambers 48 through this recess 60. The shaft 42 has port holes 61 and 610 drilled into it from opposite ends for some distance and then opening out at one side into the respective section of the chamber 48 with which that end of the shaft is connected. Connecting with the port 61 is a water pipe 62 through which cold water is introduced into the chambers 48 for the purpose of keeping the roll from getting too hot and an outlet pipe 64 leads from the port 610. The platen 33 which is preferably of copper is also made in two sections 69 with an insulating partition 65 longitudinally between the two sections. It is mounted upon the frame of the machine with which it is firmly connected, as by bolts 67 and is insulated from the frame of the machine by insulating material 68 surrounding the bolts and inserted between the platen and the supporting part of the frame.

Each section 69 of the platen is formed with a cross partition 70, see Fig. 3, dividing each section into two chambers, said partitions 70 each being formed with a hole 71 passing through the same so as to afford a water port between the two chambers of each section. Cold water pipes 72 lead into the two sections 69, each having a rubber pipe connection 73 with the supply pipe 74 to insulate the platen from the metallic supply pipe and each section 69 is also provided with an outlet pipe 75 which also has an insulating section. The arrangement of the water pipes and ports afford free circulation of water through the platen and the welding roll which serve to keep them from getting too hot.

Each section of the welding roll and its corresponding section of the platen are connected with a transformer having a primary coil 80 and a secondary coil 81. One end of the secondary coil is provided with a brush 82 which engages with annular grooves 83 in the periphery of the roll 35. The other end of said secondary coil is connected to the platen 3.

A rod 84 is secured by brackets 85 to the arm 45 of the yoke which carries the welding roll on the opposite side of the machine from the rod 51 which is attached to the arm 46 of said yoke, said rod 84 being pivotally connected by a rod 86 with a lever 87 which is fulcrumed at 88 to the beam 89 which forms a part of the frame of the machine. Said lever 87 is adapted to be rocked on its fulcrum 88 by the rising and falling of the said connecting rod 86 actuated by the rocking of said yoke on its fulcrum, said yoke being tipped up by the passage of the plates which are to be welded together beneath the welding roll. The said lever carries at its free end a contact member 90 which when it rises is adapted to make electric contact with a contact member 91 to which is connected the wire 92 which leads to one of the poles of the generator, not shown. The contact members 90 and 91 are preferably of copper. Said contact 91 is attached to a metallic plate 93, preferably copper, which forms a spring plate secured to a post or standard 94 which forms part of the frame and is insulated therefrom. Said spring plate 93 forms a yielding support for the contact 91, its free end resting upon the upper side of an insulating stop 95 which prevents the contact 91 from dropping below a certain point so that the electrical contact will not be made too soon. One end of the primary coil 80 is connected with the contact 90 and the other end of the wire of the primary coil is connected with the other pole of the generator from that to which the wire 92 is connected. The parts are so adjusted that the lever 87 will not be raised sufficiently to bring the contact 90 into contact with the contact member 91, until the jig or grid which carries the plates to be welded has entered between the welding rolls sufficiently far to bring the said plates into engagement with the contact points on the welding roll. As the plates to be welded are passed under the welding roll, when one of the buttons in the welding roll comes in contact with the upper plate the yoke will be rocked sufficiently to cause the rod 66 to lift the lever 87 and bring the contact member 90 into contact with the contact member 91, thereby making the electrical connection which produces the welding at the point where the button engages with the plate. When the welding roll has turned far enough to bring a new button into contact with the plate the circuit will be made through the said new button, and when the plates have passed from beneath the welding roll the yoke will drop, and the circuit will be broken.

One pole of each of the primary coils 80 is electrically connected with the contact 90 and the other pole of each of the primary coils 80 is electrically connected with the opposite pole of the generator from that which is connected with the contact 91 so that the contact of the two contacts 90 and 91 makes the electrical connection for both sections of the welding roll. The wiring is diagrammatically represented in Fig. 12.

The mechanism for the strip welding previously referred to and to which the plates are carried from the spot welding mechanism will now be described: The strip welding rolls 39 are movable up and down while the strip welding rolls 391 are mounted on a stationary axis. Each roll 39 is mounted on a shaft 101 which is mounted in bearings carried by a rocking yoke, each of said rocking yokes comprising two lever arms 102 fulcrumed on shaft 103, and secured to the top of each pair of arms 102 is a cross beam 104, thus making a rocking yoke somewhat similar in its action to the rocking yoke in which the spot welding roll 35 was fulcrumed. There is a separate yoke for each of the two welding rolls 39. The shaft 103 is journaled in brackets 105 which form a part of the frame of the machine. (See Fig. 2). Each shaft 101 is journaled in bearings 106 which are secured to a bracket 107, said bracket 107 being mounted on gibs 108 which form a part of the cross beam 104 of the yoke. The roll 39 is in the form of a ring secured to a collar 109 which serves as a carrier mounted fast on the shaft 101, said collar having a flange to which the roll 39 is secured by screw threaded pins 110 which pass through the rim of the wheel and into the flange of the collar 109. The bearings 106 are provided with bushings 111. The rolls or rings 39 can thus be easily mounted and can be replaced by new ones when worn out. Each bearing 106 is formed with a recess 112 in its inner periphery which is closed by a flange on the outer end of the bearing and by said bushing 111 and by a flange collar or washer 113 which lies between the collar 109 and the bearing 106, closing the space between the said collar 109 and the inner end of the bearing 106, thus making the recess 112 a chamber for the purpose of allowing a current of water to flow therethrough to prevent the bearings from becoming too highly heated. These chambers 112 are supplied with inflowing water through the pipes 114 and the water is discharged through the outlet pipes 115. These pipes should have an insulating section of rubber similar to the insulating sections of the cold water pipes connected with the platen already described. The bearings 106 are insulated from the brackets with which they are connected, by insulating material 116. The brackets 107 are clamped to the gibs 108 by the bolts 117. Said shaft 101 has ends of reduced diameter which are journaled in bearings 118 which are secured to the under side of the lever arms 102 of the yoke. A rod 119 extends up from the frame of the machine through each of the yoke arms 102 and is provided with a nut 120 on the lower side of the yoke arm which forms a stop to limit the downward movement of the said yoke, the said nut being adjustable so that the lowermost position of the yoke and therefore of the strip welding rolls 39 may be regulated and adjusted. A spring 96 coiled around the rod 119 and bearing against the upper side of said yoke arms 102 forms a tension device which holds the yoke down with a yielding pressure.

The strip welding rolls or rings 391 which co-act with the strip welding rolls 39 are each mounted on a sleeve 121, said sleeves being respectively fast on one of the shafts 122. The said rolls 391 are shown as pinned to the said sleeves 121, and are removable. The sleeve 121 of each of said shafts 122 is journaled in bearings 123 mounted on a base plate 124 which is clamped on a gib 125 by a plate 126 and clamp screw 128. The gib 125 is fastened to a bracket 127. The bearing 123 is provided with a bushing 129 and is formed with an annular recess 130 which is inclosed between the bearing and the bushing and a washer 131 to form a water chamber around the bearing, so as to prevent the bearing and the strip welding wheel 391 from getting too highly heated. The said bushing 129 and the bearing 123 and the washer 131 are all soldered together to form one piece. The bearing 123 is insulated from the plate 124. Water is introduced into the chamber 130 through a pipe 132 and is discharged through an outlet pipe 133, the inlet pipe and the outlet pipe each having an insulating rubber section as already described with reference to the other water pipes. The end of the shaft 122 opposite to that on which the sleeve 123 is mounted is journaled in a bearing 134 provided with an insulating bushing 135.

A cylindrical box 136 of conducting m- terial has its base seated against the end of the sleeve 121 and has an annular notch in the outer periphery of the base which is engaged by the side of the roll 391 which projects slightly beyond the end of the sleeve 121. This box 136 is recessed and provided with a cover 137, thus forming a water chamber into which cold water is introduced to cool the box 136 and thereby to prevent the roll 391 from becoming too highly heated. The water is introduced through the pipe 138 and is discharged through an outlet pipe 139. A spring 140 under tension between the bracket 141 and the cover 137 presses the box 136 into yielding engagement with the side of the roll 391, so as to make electrical contact.

Each pair of strip welding rolls 39, 391 is connected with a transformer, each transformer having a primary coil 150 and a secondary coil 152. Each primary coil 150 is mounted on a bracket 154. One end of the secondary coil 152 is connected with a tail piece 156 which is a part of the cylindrical box 136, thereby making electrical connection with the welding roll 391. The other end of the secondary coil 152 is connected with a tail piece 157 which is electrically connected with the shaft 101.

The cross beam 104 of one of the yokes is provided with an arm 160 to which is pivotally connected one end of the rod 161, the other end of said rod 161 being pivotally connected with the lever 162 intermediate the ends of said lever 162, said lever 162 being fulcrumed at one end on a shaft 163 which is mounted in the frame 89, the free end of said lever 162 carrying a contact piece 164, preferably copper. A contact piece 165, preferably of copper, is connected with a wire 166 which leads from one of the poles of the generator. When the yoke consisting of the arm 102 and the cross beam 104 is turned up on its fulcrum as by the passing of the plates which are to be welded between the welding rolls 39, 391, the rod 161 will lift up the free end of the lever 162 and thereby bring the contact piece 164 into contact with the contact piece 165, thus closing the circuit and causing the welding action. The contact 165 is mounted on a spring plate 167 which is mounted on the post 168. The free end of the spring plate 167 rests upon an insulating block 169 to limit the downward movement of the contact member 165, to prevent the contact with the contact member 164 from taking place too soon. One wire of each of the primary coils 150 and 151 is connected with one of the poles of the generator. The contact 164 is connected with the other wire of the primary coils. The contact 165 is electrically connected with the other pole of the generator, all as shown by diagram in Fig. 13. When the two contact members 164 and 165 come into contact with each other, as above described, the circuit is closed through both primary coils and both pairs of strip welding rolls will become operative.

The presser roll 32 is mounted on the shaft 180 which is journaled in arms 181 fulcrumed on the shaft 182 and is held in yielding engagement with the feed roll 31 by a spring 183. Mounted on the shaft 180 is a pinion 184 which engages with a pinion 185 on the feed roll shaft 186. Said feed roll shaft 186 carries on its other end, opposite to the pinion 185, a bevel gear 187 which engages a bevel gear 188 on one end of a shaft 189, said shaft 189 carrying a bevel gear 190 which engages with a bevel gear 191 on shaft 192 which carries the feed roll 36, so that the two feed rolls 31 and 36 will rotate at the same speed. Presser roll 37 is mounted on a shaft 193 journaled in arms 194 fulcrumed on shaft 195, and said presser roll is held in yielding engagement with the feed roll by a spring 196.

A driving shaft 201 carries a spur gear 202 which engages with a spur gear 203 on the shaft 47 whereby the shaft 47 is driven. Mounted on said shaft 47 is a bevel gear 204 which engages with the bevel gear 205 on a shaft 206, said shaft 206 being journaled in bearings 207 and carrying also a bevel gear 208 which engages with the bevel gear 209 on the spot welding roll shaft 42, thus making driving connection between the driving shaft 201 and the spot welding roll.

The shaft 201 carries a worm gear 210 which engages with a worm 211 on the shaft 212, said shaft 212 carrying also the two pulleys 213, and 214, said pulley 213 being fast on the shaft and the pulley 214 being loose on the shaft. A belt (not shown) connected with suitable driving mechanism may be shifted from the loose pulley to the tight pulley to start the machine. Shaft 189 carries a bevel gear 216 which engages with a bevel gear 217 on driving shaft 201, and also carries bevel gears 197, 218 and 219 which engage with bevel gears on the carrier rolls 38, 381 and 382.

The lower welding rolls, 391, are driven by the shaft 201 through the following mechanism. Mounted on the shaft 201 is a spur gear 220 which engages with the spur gear 221 on a stud 222. Mounted on the hub of said gear 221 is a sprocket wheel 224. Mounted on one of shafts 122 is a sprocket wheel 225, and a sprocket chain 226 connects sprocket 225 with sprocket 224, thereby giving rotation to the shaft 122 which carries one of the welding rolls 391, that is, the one which is shown on the left-hand side of Fig. 5. The other shaft 122 which carries the other welding roll 391 carries a sprocket wheel 230 which is connected by a chain 227 with a sprocket wheel on shaft 47, and the shaft 47, as already described is driven by the shaft 121. The said second shaft 122 and the second welding roll 391 will thus be driven.

The upper strip welding rolls 39, 39 are driven by gear connection of the shafts 101 and 101 with the shafts 122, and 122 respectively, as follows: Mounted on each of the shafts 122 is a spur gear 228 which engages with the spur gear 229 on the shaft 101, the spur gear 228 being made of fiber or other insulating material so as to prevent electrical connection between the two gears. The gear 228 on one of the shafts 122 engages with a gear 230 which in turn engages with a train of gears 231, 232 and 233 to actuate the carrier rolls 40 which carry off the welded plates after they have passed the strip welding rolls. Each of the carrier rolls 30, 38, 381, and 382 is provided with beveled collars 240, which form guides for the work as it passes through the machine. These collars are split and clamped to the rolls on which they are mounted and may be adjusted to different distances apart from each other according to the width desired.

During the operation of the spot welding roll the points of the buttons 34 will attach to themselves fine particles of metal from the plate with which they come in contact and thereby diminish the conductivity. For this reason there is provided means for brushing the points of the buttons 34 during each rotation. The means provided are as follows: A roll 97 of emery or other suitable abrasive material is journaled alongside of the welding roll sufficiently close to the spot welding roll to grind the points 34 of the spot welding roll at each rotation. The shaft of the grinding roll carries a pulley 98 which is connected with suitable driving mechanism to rotate the grinding roll in opposite direction to the rotation of the welding roll. In order to allow for the gradual wearing away of the grinding roll and of the points 34 the bearings of the grinding roll shaft are made adjustable so that the grinding roll may be moved toward the welding roll as occasion requires.

In the diagram of the wiring for the spot welding roll shown in Fig. 12 one wire of each primary is connected with a wire 142 leading to the contact 90. The other wire of each primary is connected with the wire 143 leading to one pole 144 of a switch 148, and the wire 92 which leads from the contact 91 connects with the other pole 145 of the switch. By means of the switch which is connected with the generator the current may be turned on or off at any time. One end of each secondary coil is connected by a wire 146 with the platen 33 and the other end of each secondary coil is connected by a wire 147 with the brushes 82.

In the diagram of the wiring connected with the strip welding rolls, as shown in Fig. 13, one wire of each primary 150 is connected with a wire 170 leading to the contact 164 and the other wire of each primary is connected with the wire 171 leading to one of the poles 172 of the switch 173 connected with the generator, and the wire 166 which leads from the contact 165 is connected with the other pole 173 of the switch 174. One end of each secondary coil 152 is connected by a wire 175 with the tail piece 157 which is connected with the strip welding roll 39, and the other end of each of said secondary coils is connected by a wire 176 with the tail piece 156 of the lower strip welding rolls 391.

During the operation of the strip welding rolls 39, 391 fine particles of metal from the plate with which they come in contact will attach themselves to the said rolls and thereby diminish the conductivity of the said rolls in the same manner as described with reference to the spot welding rolls. For this reason it is important to provide means for brushing these particles from the strip welding rolls. Any suitable means may be provided. One means for doing this is shown in the drawings, although it is not intended to limit the invention to the particular means shown. The means shown, however, are as follows: A guide bar 241 extends transversely of the machine parallel with the shafts of the strip welding rolls. Slidably mounted on said guide bar is a carrier 242 having an arm 243 which extends toward the strip welding rolls. Said arm 243 carries a bearing 244 in which is mounted a shaft 245 which carries a grinding or abrading wheel 246 which as will be hereinafter explained is adapted to be moved into position to be engaged by the strip welding rolls during their rotation to grind off the particles which may be attached to the strip welding rolls. The shaft 245 and therefore the grinding roll 246 may be rotated by any suitable driving mechanism, the means shown in the drawings being an electric motor 247 which carries on its shaft a pulley 248 which is connected by a belt 250 with a pulley 249 on the shaft 245. The guide bar 241 rests on the frame 251. Adjusting screws 252 pass transversely through the said guide bar 241 near each end, the inner end of each of said adjusting screws passing through a fixed bracket 253, said adjusting screws being each provided with a head 254 and a collar 255, said head and collar bearing against opposite sides of the bracket 254 so that the adjusting screw is prevented from longitudinal movement when the screw is turned. The hole in the guide bar 241 through which the adjusting screw passes is tapped out so that by turning the adjusting screws the guide bar will be moved near enough to the strip welding rolls so that by then sliding the carrier on the guide bar to bring the grinding roll into alinement with the welding roll, it will engage the welding roll. Preferably the grinding apparatus is so located that the grinding roll will at the same time engage with one of the upper strip welding rolls 39 and with one of the lower strip welding rolls 391. The grinding roll is made movable transversely of the machine so that it may be brought into engagement with the strip welding rolls of one section at one time and then moved over to the other side of the machine to engage with the strip welding rolls of the other section and also to enable the grinding roll to be moved to one side to permit the passage of the plates to be welded between the welding rolls. When the bar 241 is adjusted it will be clamped in the adjusted position by means of a clamp screw 256.

The operation of the machine is as follows,—If the two plates are to be spot welded together, as for instance the flat plate 2 and the corrugated plate 3, as previously described, the two said plates being properly assembled in the manner previously described in the grid, as shown in Figs. 7 and 8, the grid will be placed upon the rolls 30 properly positioned between the guide collars 240 and advanced until the plates are gripped between the feed roll 31 and the presser roll 32, and as soon as gripped by said feed and presser rolls the assembled parts will be carried between the spot welding roll and the platen and will be fed through. When one of the buttons 34 of the spot welding roll comes in contact with the flat plate 2 the electrical circuit will be closed in the manner already described and the two plates will be united by a welding spot. As the plates continue to feed forward they will be welded together in as many spots as the number of times that they come in engagement with one of the buttons. As soon as the plates pass through sufficiently far to come into engagement with the second feed roll 36 they will be gripped between said feed roll and the presser roll 37 so as to insure that the feed will be continued after the work passes from between the feed roll 31 and presser roll 32. It will pass from the feed roll 36 out on to the carrier roll 38 and thence onward but it will be removed before it is engaged by the feed rolls which lead to the strip welding rolls or the strip welding rolls may be raised out of contact with the panel, or the current may be cut off so that if the plates are allowed to continue on through the strip welding rolls there will be no welding by the strip rolls. Then the two parts which have thus been welded together will be assembled with the plate 1 and the hinge plates in the jig as previously described, being now turned up side down so that the flat plate 1 instead of plate 2 will come on top, and it will be drawn through over the platen and beneath the spot welding roll, thus welding together the plate 1 and the corrugated plate 3. This time the three plates thus welded together carrying the hinge plates assembled with them will be allowed to be carried forward between the strip welding rolls, and the two hinge members on opposite edges of the assembled plates will be welded to both plates 1 and 2, the plate 2 being welded to one leg of the hinge plate and the plate 1 being welded to the other leg of the hinge plate by a continuous line of welding parallel with the edge.

What I claim is:

1. In an electric welding machine, a rotary welding roll having a plurality of electric contact points projecting therefrom, in combination with a platen of conducting material mounted in relation to the welding roll in such manner that when the material to be welded is passed between the welding roll and the platen it will be engaged by the contact points on said welding roll, and feed rolls which automatically feed the work into and out from between the welding roll and the platen.

2. In an electric welding machine, a rotary welding roll having a plurality of contact points projecting therefrom, in combination with a platen of conducting material mounted in relation to the welding roll in such manner that when the material to be welded is passed between the welding roll and the platen it will be engaged by the contact points on said welding roll, feed rolls which automatically feed the work into and out from between the welding roll and the platen, and means for driving said feed rolls and said welding roll at the same surface rate of speed.

3. In an electric welding machine, a rotary welding roll having a plurality of contact points projecting therefrom, said welding roll comprising a plurality of cylinders of conducting material concentric with each other, and insulating material separating electrically said sections from each other, all of said sections being united together into one rigid roll.

4. In an electric welding machine, a rotary welding roll having in its periphery a plurality of contact points, said welding roll comprising a plurality of cylinders of conducting material concentric with each other, insulating material separating electrically said sections from each other all of said sections being united together into one rigid roll, in combination with a platen composed of a plurality of sections of conducting material corresponding with the several sections of the said welding roll, insulating material separating electrically the said several sections of the platen, said platen being so located with relation to the welding roll that when a plurality of plates of conducting material superposed upon each other are passed between said welding roll and said platen, one of said plates will be engaged by the contact points on said welding roll and another of said plates will be in contact with said platen.

5. In an electric welding machine, a rotary welding roll having a plurality of contact points projecting therefrom, in combination with a platen of conducting material mounted in relation to the welding roll in such manner that when the articles to be welded together are passed between the welding roll and the platen one of the articles will be engaged by the contact points on said welding roll, said contact points being so disposed on said welding roll that each one of said contact points makes welding contact with the work and then passes out of welding contact before another one of said contact points comes into welding contact with the work, but in passing off from the work said first contact point continues in sufficient contact to afford a continuous outlet for the current until the said next succeeding contact point comes into contact with the work sufficiently to carry the current but not sufficiently to make simultaneous welding contact.

6. In an electric welding machine, a rotary welding roll having a plurality of contact points projecting therefrom, said contact points being so disposed on said welding roll that each one of said contact points makes welding contact with the work and then passes out of welding contact before another one of said contact points comes into welding contact with the work, but in passing off from the work said first contact point continues in sufficient contact to afford a continuous outlet for the current until the said next succeeding contact point comes into contact with the work sufficiently to carry the current but not sufficiently to make simultaneous welding contact.

7. In an electric welding machine, a rotary welding roll having in its periphery a plurality of contact points disposed in such manner that only one of the said contact points will be in welding contact with the material at any one time, and that each contact point will gradually release its pressure and contact, remaining in sufficient contact to afford an outlet for the current until the welding roll rotates far enough for another contact point to take up the contact.

8. In an electric welding machine, a rotary welding roll having in its periphery a plurality of contact points, a support of conducting material for the work which is to be welded and between which and the welding roll the work is passed and so mounted in relation to the welding roll that when the work is fed along on the said support and said welding roll is rotated said contact points on the welding roll will successively engage the work and close the circuit, in combination with a rotary strip welding roll having a continuous ring of conducting material around its periphery, a support for the materials to be welded together located beneath said welding roll, said support being composed of electric conducting material and so located with relation to the said welding roll that when the said materials which are to be welded together are fed between said welding roll and said support they will be in electrical contact with the said support and with the welding roll, and means for automatically carrying the work from said spot welding mechanism to and through said strip welding mechanism.

9. In an electric welding machine, a rotary welding roll having in its periphery a plurality of contact points, a lever having bearings in which said welding roll is journaled, and a shaft on which said yoke lever is fulcrumed, and on which said yoke lever may be rocked to raise or lower said welding roll.

10. In an electric welding machine, a rotary welding roll having a plurality of contact points projecting therefrom, a yoke lever having bearings in which said welding roll is journaled, a shaft on which said yoke lever is fulcrumed, and on which said yoke lever may be rocked to raise or lower said welding roll, in combination with a support for the articles which are to be welded together, said support being made of conducting material, and located beneath said welding roll and adjacent thereto so that when the articles to be welded together are superposed upon each other and fed across said support beneath the welding roll, one of said articles will be successively engaged by said contact points on the welding roll, and the other of said articles will be in contact with said support, in combination with a source of electric energy having one pole connected with said welding roll and having the other pole connected with said support whereby the successive contacts of said points on the welding roll with said material will make successive closures of the circuit.

11. In an electric welding machine, a support of conducting material for the articles to be welded, a rotary welding roll above said support and adjacent thereto, having conducting material in its periphery, a rocking mount in which said welding roll is journaled whereby the passing of material between said roll and support of greater thickness than the space between the roll and support will raise the roll and rock the mount, a source of electric energy, electric connection between said source of electric energy and said welding roll and said support, a make and break device in the circuit having two contact members normally separated from each other, one of said contact members being connected with said rocking mount, and being actuated by the rocking of the mount when the work passes between the roll and said work support to close the circuit.

12. In an electric welding machine, a support of conducting material for the work which is to be welded, a rotary welding roll adjacent to said support and having conducting material therein, a movable mount for said welding roll which together with the welding roll is raised and lowered by the passing between the said welding roll and work support of work of greater thickness than the space between said welding roll and work support, an electric circuit which includes said welding roll and work support, a make and break device in said circuit having two contact members normally out of contact with each other, one of which is connected with and actuated by the said movable mount for the welding roll during the passing of work between the said work support and said welding roll to make the contact with said other contact member, the said roll and work support also being electrically connected by said work contacting with both said roll and support, thereby closing the circuit.

13. In an electric welding machine, mechanism for welding together electrically two metal plates at different spots, mechanism for welding together electrically two metal plates along a strip line, and means for automatically feeding the said metal plates through one of said welding mechanisms, and thence to and through the other of said welding mechanism.

14. In an electric welding machine, mechanism for welding together electrically two metal plates at different spots, mechanism for welding together electrically two metal plates along a strip line, a holder for a plurality of plates which holds them in proper relation to each other for welding, and means for automatically feeding the holder with said plates through one of said welding mechanisms and thence to and through the other of said welding mechanisms.

15. In an electric welding machine, a rotary welding roll having conducting material thereon, a movable mount for said roll, a work support beneath said welding roll and adjacent thereto, having conducting material therein, a source of electric energy, an electric circuit with which said welding roll and work are each connected electrically, said roll and work support being normally separated from each other, two contact points in the circuit normally separated from each other, thereby making a break in the circuit, a lever connection between one of said contact points and said roll, said roll being elevated by the passing of work between the roll and said work support of greater thickness than the normal space between said roll and support and thereby actuating the said lever to cause said movable contact to engage the other contact and close the circuit.

16. In an electric welding machine, a rotary welding roll having a plurality of electric contact points in the periphery thereof, an electric circuit which is normally open and with which said contact points are electrically connected, a work support over which the material to be welded is passed, and which is within said electric circuit, a make and break device within said circuit, and means whereby the introduction of conducting material between said work support and said welding roll will close the circuit each time that one of said contact points engages with said introduced conducting material.

17. In an electric welding machine, a rotary welding roll having in its periphery contact points disposed in staggered relation to each other.

18. In an electric welding machine, a rotary welding roll having conducting material in its periphery, a support for the articles to be welded, said support being made of conducting material and located beneath said welding roll and adjacent thereto so that when the articles to be welded together are fed across said support beneath the welding roll the uppermost of said articles will be engaged by said welding roll and the lowermost of said articles will be in contact with said support, a source of electric energy having one pole connected with said welding roll and the other pole connected with said support whereby the contact of said articles to be welded with said support and with said welding roll will close the circuit, in combination with a holder having means whereby said articles to be welded together are retained in their assembled form during the passage of said articles through the welding machine.

19. In an electric welding machine, a rotary welding roll having in its periphery a plurality of contact points disposed in staggered relation to each other in such manner that only one of the said contact points will be in welding contact with the material at any one time, but that it will gradually release its pressure and contact, remaining in sufficient contact to afford an outlet for the current until the welding roll rotates far enough for another contact point to take up the contact.

In testimony whereof I affix my signature, in presence of two witnesses.

SAMUEL B. FIELD.

Witnesses:
WILLIAM A. COPELAND,
ALICE H. MORRISON.